March 1, 1938.   G. L. REES   2,110,005
LEG SUPPORT
Filed July 2, 1936
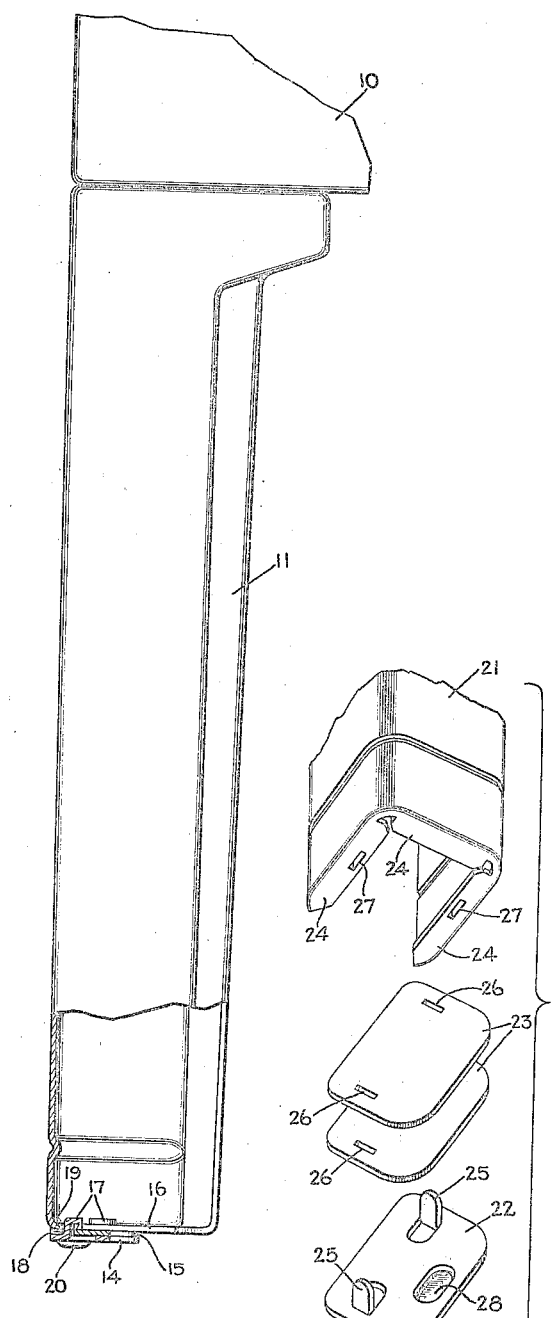
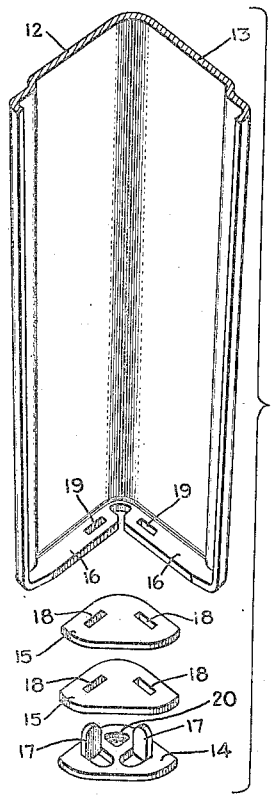
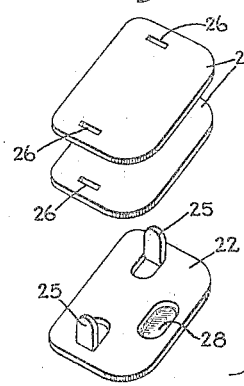
Inventor:
Gregory L. Rees,
by Harry E. Dunham
His Attorney.

Patented Mar. 1, 1938

2,110,005

REISSUED

UNITED STATES PATENT OFFICE 2,110,005

LEG SUPPORT

Gregory L. Rees, La Grange, Ill., assignor to Edison General Electric Appliance Company, Inc., Chicago, Ill., a corporation of New York Application July 2, 1936, Serial No. 88,643

6 Claims. (Cl. 45—139)

This invention relates to leg supports, more particularly to supports which may be used in levelling appliances, such as electric ranges and the like, and it has for its object the provision of an improved device of this character.

In accordance with this invention, the leg support in one form thereof has a base adapted to rest on the floor and to support above it and under the associated leg one or more shim laminations, as is necessary to level the appliance. The base in one form of this invention is provided with upright flexible lugs inserted through apertures provided for them in the laminations and having their ends peened over so as to secure the laminations to the base. The lugs also may be and preferably will be directed through apertures provided in the leg so as to secure the device as a whole to the leg.

For a more complete understanding of this invention, reference should be had to the accompanying drawing in which Fig. 1 is an elevation of an electric range leg provided with a support embodying this invention, portions of the leg and support being shown in section so as to illustrate certain details of construction; Fig. 2 is a fragmentary perspective view of a portion of the range leg of Fig. 1, together with the support parts arranged in expanded relation with reference to the leg so as to show their cooperative relation with each other and with the leg; and Fig. 3 is a view similar to Fig. 2, but illustrating my invention as applied to a range leg of different shape.

Referring to the drawing, this invention has been shown in one form as applied to an electric range 10. The electric range 10 is provided with four legs 11 at the corners, only one of which is shown in the drawing. The leg 11 is made of sheet metal material which is bent into the desired shape. As shown, the leg is bent into the shape of an angle iron having two sides 12 and 13 arranged at right angles to each other and joined together at their intersection. It is to be understood that while this invention has been shown as applied to a sheet metal leg formed in angle shape, it is applicable to legs formed of different materials and having various other shapes.

The leg 11 at its top is secured to the body of the range by any suitable means forming no part of this invention.

The support structure in accordance with this invention comprises a base 14. The base 14 will be formed in any suitable manner, but preferably will be stamped from a sheet of metal. The base may be made of any suitable metal, such as steel or brass. The base 14 is adapted to rest upon the floor so as to constitute a floor plate for the leg 11. And also, it functions to support between itself and the leg one or more shim laminations 15, as is necessary to level the range. As shown in Fig. 1, there is one lamination 15 between the base 14 and the leg, whereas in Fig. 2 two laminations 15 are used. It will be understood that the base may be used alone where it is found that it gives sufficient height. The laminations 15 also preferably will be stamped from a sheet of metal, and also may be formed of steel or brass. The base 14, as well as the shim laminations 15, have roughly a triangular form so as to conform substantially to the triangular section of the leg 11, as clearly shown in Fig. 2.

The lower ends of the leg sides 12 and 13 are provided with inturned flanges 16 which, as shown rest upon the shims. The laminations 15 are secured to the base 14 and the base and laminations to the flanges 16 by means of suitable upright lugs 17 formed on the base. Preferably, the lugs 17 will be formed integrally with and of the metal of the base. The lugs may conveniently be formed by pressing them upwardly from the stock of the base, as clearly shown in Fig. 2. This may be accomplished by means of suitable dies (not shown). The lugs 17 are directed upwardly through apertures 18 provided for them in the laminations 15 and through corresponding apertures 19 provided for them in the flanges 16. If desired, the upper ends of the lugs 17 may then be peened over, as shown in Fig. 1, to rigidly secure the laminations to the base and the base and laminations to the leg 11. This, however, is not necessary as the shim functions properly whether or not the lugs are peened over. Preferably, the lugs will not be peened over where the range is moved rather frequently from one place to another, because this arrangement facilitates readjustment of the support to level the range in the new location. It will be understood that any suitable number of lugs 17 may be used, but generally a pair will be sufficient when directed upwardly through the two side portions of the laminations 15 and into the two flanges 16, as clearly shown in the drawing. It will also be understood that the metal of the plates, while relatively rigid is sufficiently resilient to permit the lugs 17 to be bent or peened over, as shown in Fig. 1.

The base 14 is also provided at its apex under the corner of the leg where the sides 12 and 13 intersect with a depending protuberance 20 constituting a smooth rounded bearing surface which rests upon the floor and which supports the base in a slightly elevated position with reference to the floor. The protuberance 20 also preferably will be formed integrally with and of the material of the base. This may be accomplished by striking the metal stock of the base downwardly to form the protuberance in any suitable die.

In Fig. 3, my support is illustrated as applied to a range leg 21 of modified form. As shown, this leg has in general a substantially U-shaped section. The base 22 and the laminations 23 in this case have substantially a rectangular shape, conforming in general to the contour of the leg, as clearly shown in Fig. 3. The lower end of the leg is provided with inturned flanges 24 which rest upon the support, and the base has upright lugs 25 directed through apertures 26 and 27 provided for them in the laminations and flanges respectively, as shown. Here again, the lugs 25 may or may not be peened over after assembly. The base is also provided with a depending protuberance 28 between its sides and adjacent one edge so that when the support is assembled with the leg it lies substantially under the flange 24 of the base of the U-shaped leg. This protuberance acts as a foot for the support.

While this invention has been shown as applied to triangular- and rectangular-shaped legs, it will be understood that it is applicable to legs having other shapes, such as legs having oval and round sections, etc.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A leg support for an appliance comprising a base constituting a floor plate, shim laminations between said base and said leg, said base being provided with upright flexible lugs directed through apertures provided for them in said laminations and also in said leg, the flexible lugs having their upper ends peened over to secure said laminations and base to each other and to said leg.

2. A supporting and levelling device for the leg of an appliance comprising a base constituting a floor plate, shim laminations between said base and said leg, said base being provided with upright flexible lugs directed through apertures provided for them in said laminations and leg, and further, having a depending protuberance adapted to rest on said floor to support said base in spaced relation with reference to the floor.

3. A support for the leg of an appliance comprising a base constituting a floor plate, shim laminations between said base and said leg, said base being provided with upright flexible lugs formed integrally with and of the material of said base and directed through apertures provided for them in said laminations to secure said laminations to said base, and said base also provided with a protuberance on its under side formed integrally with and of the material of said base and adapted to rest on said floor to space said base from the floor.

4. In an appliance having an angular metallic leg, a supporting and levelling structure for said leg comprising inturned flanges on the lower edges of the two sides of said leg, shim laminations of angular shape corresponding to the shape of said angular leg under said flanges, and a base of similar shape supporting said laminations and having a plurality of upright flexible lugs directed through apertures provided for them in said laminations and flanges and peened over on said flanges to secure said laminations and base to said leg.

5. In an appliance having a leg of substantially U-shape, a supporting structure comprising inturned flanges on the sides of said leg, a rectangular shim plate under said leg, and laminations of rectangular shape on said plate under said flanges, said plate having upright lugs formed integrally with and of the material of said plate directed through apertures provided for them in said laminations and in said flanges.

6. A support for the leg of an electric range and the like comprising a base constituting a floor plate, shim laminations on said base between said base and a part of said leg, said base having upright relatively small flexible lugs directed through relatively small apertures provided for them in said laminations, and said part of said leg having relatively small apertures registering with those in said laminations to receive said flexible lugs, and said flexible lugs being capable of being peened over to lock said base and laminations to said leg.

GREGORY L. REES.